United States Patent [19]

Sasaki

[11] Patent Number: 4,934,851

[45] Date of Patent: Jun. 19, 1990

[54] TEXT PROCESSING SYSTEM INCLUDING PLURAL TEXT AND CORRESPONDING MEMORIES

[75] Inventor: Ryoichi Sasaki, Nagoya, Japan

[73] Assignee: Brother Kogyo Kabushiki Kaisha, Tokyo, Japan

[21] Appl. No.: 138,826

[22] Filed: Dec. 28, 1987

[30] Foreign Application Priority Data

Dec. 29, 1986 [JP] Japan .................. 61-315825

[51] Int. Cl.⁵ .............................................. B41J 5/30
[52] U.S. Cl. ........................................ 400/63; 400/83; 400/279
[58] Field of Search ............. 400/61, 62, 63, 67, 400/68, 70, 83, 279, 697.1; 364/200, 900; 340/709, 717, 731

[56] References Cited

U.S. PATENT DOCUMENTS

| | | | |
|---|---|---|---|
| 3,786,429 | 1/1974 | Goldman et al. | 400/63 X |
| 4,054,948 | 10/1977 | Grier et al. | 400/83 X |
| 4,220,417 | 9/1980 | Sprott et al. | 400/70 |
| 4,252,451 | 2/1981 | Clancy et al. | 400/697.1 X |
| 4,370,707 | 1/1983 | Phillips et al. | 364/200 |
| 4,416,558 | 11/1983 | McInroy et al. | 400/279 |
| 4,553,860 | 11/1985 | Imaizumi et al. | 400/83 X |
| 4,580,916 | 4/1986 | Rolfo et al. | 400/83 X |
| 4,725,158 | 2/1988 | Ueda et al. | 400/63 |

FOREIGN PATENT DOCUMENTS

| | | | |
|---|---|---|---|
| 0110632 | 6/1984 | European Pat. Off. | 400/61 |
| 2031626 | 4/1980 | United Kingdom | 400/63 |
| 2130772 | 6/1984 | United Kingdom | 400/83 |
| 2143066 | 1/1985 | United Kingdom | 400/68 |

OTHER PUBLICATIONS

IBM Technical Disclosure Bulletin, "Line Count and Search", McDonald et al, vol. 9, No. 12 May 1967, pp. 1715-1716.

Primary Examiner—Ernest T. Wright, Jr.
Attorney, Agent, or Firm—Kane, Dalsimer, Sullivan, Kurucz, Levy, Eisele and Richard

[57] ABSTRACT

Disclosed is a text processing system such as a word processor and an electronic typewriter. The disclosed system comprises a plurality of text data memory means including external memories, and title memory means for storing the titles of the text data stored in the text data memory means in relation to the kind of the text data memory means. The titles of the text data stored in the title memory means are visually represented on the outputting means with being classified by the kind of the text data memory means.

4 Claims, 4 Drawing Sheets

TEXT PROCESSING SYSTEM INCLUDING PLURAL TEXT AND CORRESPONDING MEMORIES

BACKGROUND OF THE INVENTION

1. Field of the Invention

This invention relates to a text or word processing system equipped with a display means and, more particularly, to an improved system capable of visually representing the titles of text data, which are stored in various data memories including a text memory, by classifying the titles in accordance with the kinds of data memories.

2. Description of the Prior Art

Generally in the conventional text processing system such as an electronic typewriter equipped with a display unit, there are provided in its controller a plurality of data memories including a text memory for storing a plurality of texts inputted from a keyboard and a phase memory for storing a plurality of phrases, and a plurality of title memories for storing the titles of data stored in the data memories.

When a command is given to display the titles of the data in the text memory by selection of a list mode, the titles are sequentially represented on the display unit, in accordance with the data of the text memory, in alphabetical order or in the order of storage starting from the latest title, by depression of a cursor down-shift key. When another command is given to display the titles of the data in the phrase memory by selection of a list mode, the titles are sequentially represented on the display in accordance with the data of the phrase title memory by depression of the cursor down-shift key.

In an arrangement where any external memory such as a RAM (Random Access Memory) card or a floppy disk is connected to the typewriter, if a command is given to display the titles of such external memory by selection of a list mode, the titles are visually represented on the display by repeated depression of the cursor down-shift key, sequentially either in alphabetical order or starting from the latest title.

In the conventional electronic typewriter as described above the titles of the data of the text memory and those of the phrase memory are displayed with distinction therebetween, but it is impossible to achieve simultaneous visual representation of the titles. Consequently, there exist some problems including that if the memory storing a desired title is unknown, it becomes necessary to select a list mode each time and to give a command for displaying the text titles of the phrase titles for phrase memory, hence complicating the manipulation for visual representation of the titles and deteriorating the operational efficiency in retrieval of the titles.

Furthermore, in case any external memory is connected, the manipulation for selecting such external memory is required, and title retrieval cannot be executed with facility since it is impossible to perform simultaneous visual representation of the titles of the external memory and the internal memories in the typewriter.

SUMMARY OF THE INVENTION

It is therefore an object of the invention to provide an improved text processing system capable of visually representing the titles of data, which are stored in various data memories including a text memory, by classifying the title in accordance with the kinds of data memories.

For the above purpose, according to the invention, there is provided a text processing system which comprises: input means for inputting data including text and phrase data; outputting display means for visually representing the input text data; a plurality of data memory means for storing the titles of the data stored in said data memory means corresponding to the kind of said data memory means; control means for visually representing said titles of the data stored in said title memory means on said outputting means, said titles being classified by the kind of said data memory means; and designating means for designating one of said titles represented on said outputting means for further word processing.

With the above constructed system, data entered from the input means is written into the data memory means, while the titles of the data stored in the data memory means are stored in the title memory means in relation to the kind of the data memory means. In response to, for instance, a title display command entered from the input means, the titles of the data stored in various memory means are visually displayed together, in a classified fashion, in accordance with the kinds of the data memory means (i.e. internal text, internal phrase, or external text memory means) on the outputting display means by the control means.

Then, an operator may designate or select one of the titles represented on the outputting display means by the designating means for word processing.

Thus, titles of data stored in a plurality of kinds of data memory means can be visually represented together on the outputting display means while being classified in accordance with the kind of the data memory means, whereby retrieval of titles is executed with rapidity and facility to consequently enhance the operational efficiency in such retrieval.

DETAILED DESCRIPTION OF PREFERRED EMBODIMENTS

Figure 1:
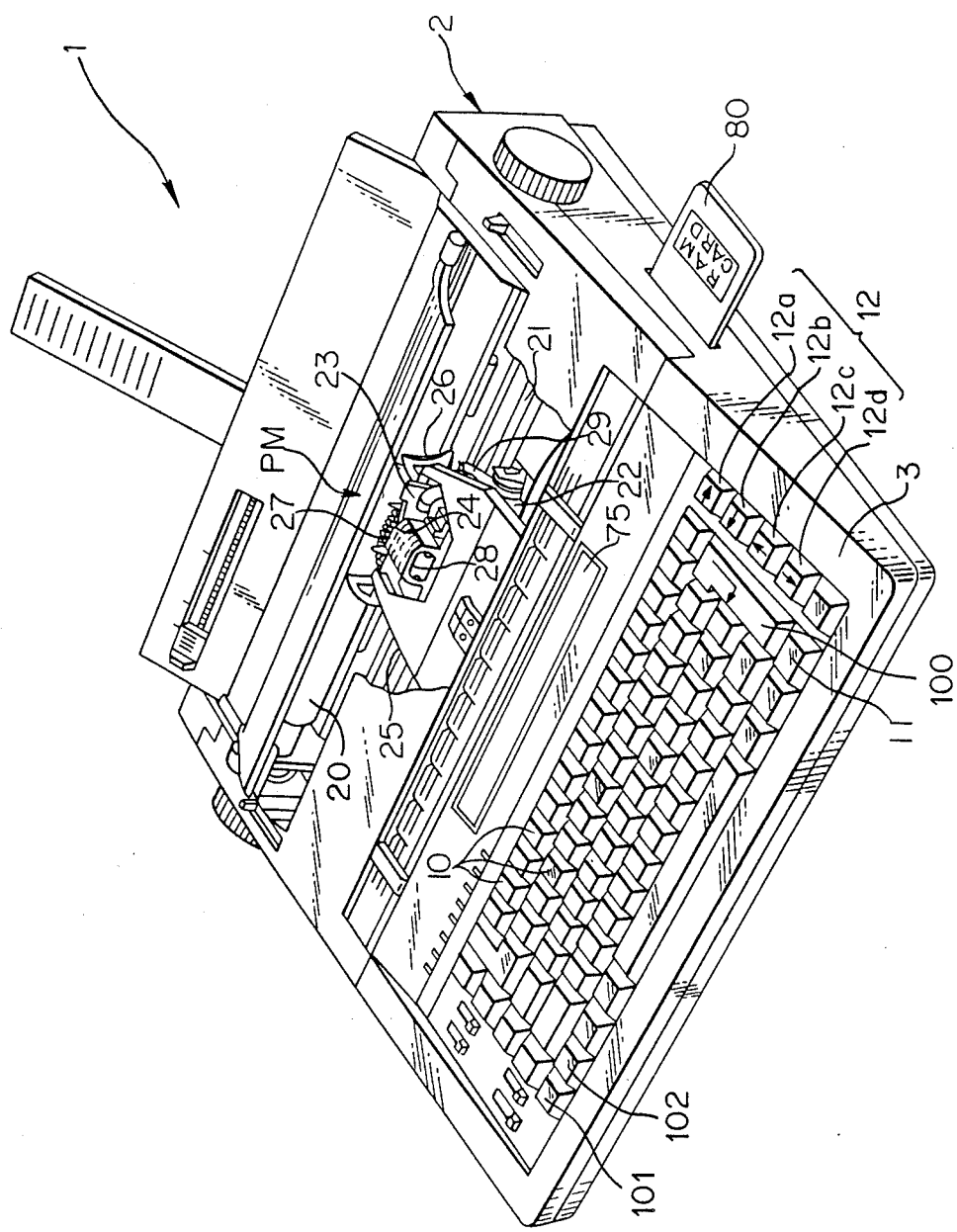
FIG. 1 is a perspective view of an electronic typewriter embodying the invention.

FIG. 1 illustrates an electronic typewriter embodying the invention, wherein a keyboard 3 is disposed in a front portion of a body frame 2 of a typewriter 1, and a print mechanism PM is incorporated in the frame 2 behind the keyboard 3. A two-line LCD (Liquid crystal display) 75 is disposed in a rear portion of the keyboard 3 for visually displaying input characters and symbols.

The keyboard 3 is furnished with character keys 10 including alphabetic keys, numeral keys and symbol keys, and also with various function keys typical to any ordinary typewriter including cursor control keys 12, and a carriage return key 100.

Furthermore, the keyboard 3 has a mode changeover key 11 which is an on/off key to be depressed for alternately selecting a typewriter mode to print the input characters or a word processor mode to input and edit the characters. The cursor shift keys 12 are used for shifting cursor display position upward, downward, leftward and rightward respectively.

Upon execution of title display control described below, the next title is displayed by the cursor down-shift key 12d, and the preceding title is displayed by the cursor up-shift key 12c.

The print mechanism PM is similar to the ones used in other typewriters. For the sake of clarity only the major components of the print mechanism PM are shown. The print mechanism PM includes: a platen 20 for feeding a print sheet, a motor for actuating the platen 20, and a platen motor drive circuit; a carriage 22 supported by a guide 21 parallel with the platen 20, a motor for reciprocating the carriage 22 leftward and rightward, and a carriage motor drive circuit; a type wheel 24 housed in a wheel cassette 23, a motor for rotating the type wheel 24, and a wheel motor drive circuit; a print ribbon 26 housed in a ribbon cassette 25, a motor for taking up the print ribbon 26, and a ribbon motor drive circuit; a motor for selectively changing the position of the print ribbon 26, and a motor drive circuit; a print hammer for striking each type element 27 of the type wheel 24, a solenoid 28 for driving the print hammer, and a solenoid drive circuit; a correction ribbon 29 for erasing a printed character, and a mechanism for driving the correction ribbon 29 by the ribbon position changeover motor.

Figure 2:
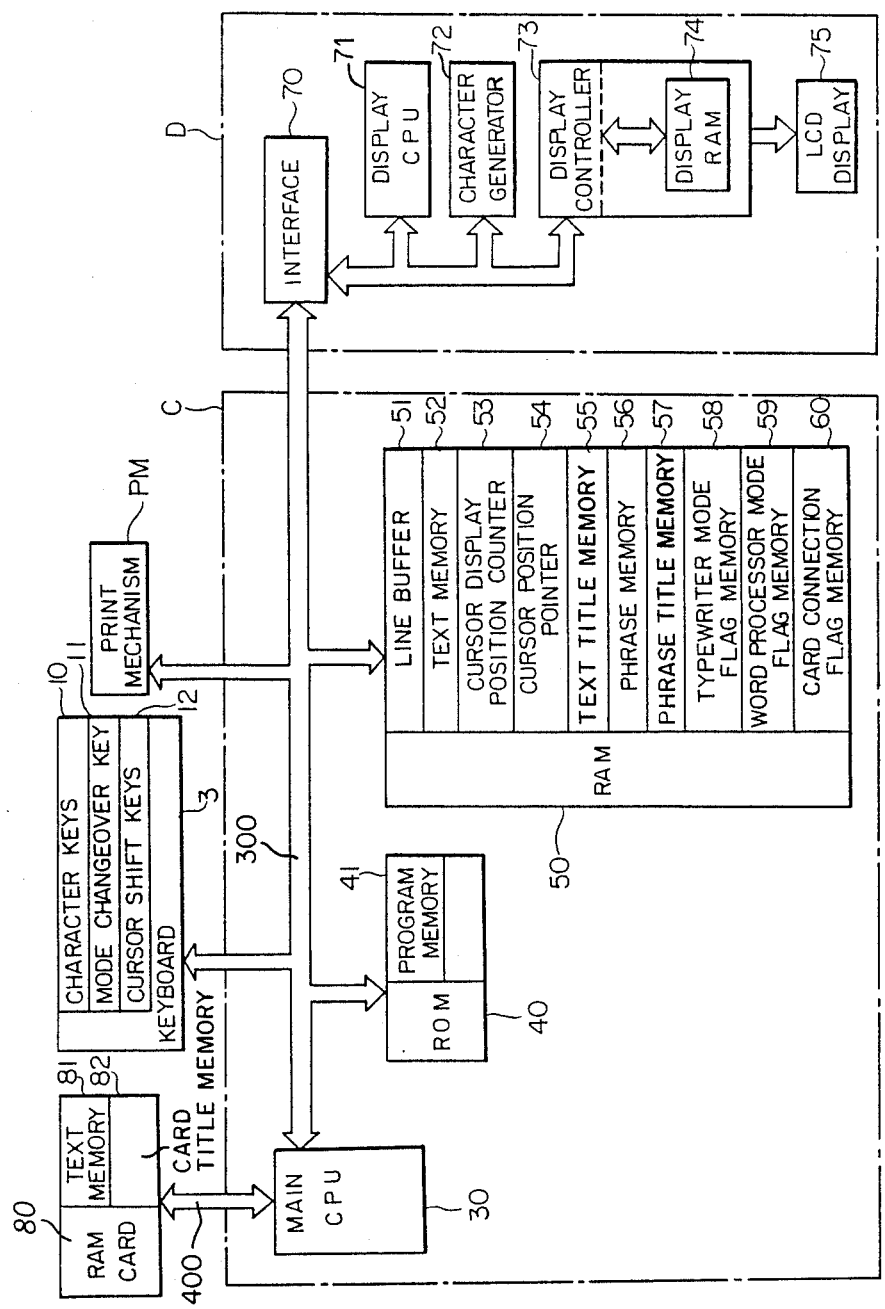
FIG. 2 is a block diagram of a control system in the typewriter.

Now, the entire construction of the control system in the electronic typewriter 1 will be described below with reference to a block diagram shown in FIG. 2.

Basically, the typewriter 1 comprises a keyboard 3, a print mechanism PM, a display mechanism D and a controller C. The keyboard 3, the print mechanism PM and the display mechanism D are connected to a main CPU (central processing unit) 30 of the controller C via a data bus 300.

The controller C comprises a main CPU 30, a ROM (read only memory) 40 and a RAM (random access memory) 50 connected to the main CPU 30 via the data bus 300. A RAM card 80 serving as an external memory is connected also to the main CPU 30 via an input-output bus 400.

In a program memory 41 of the ROM 40, there are stored a control program for controlling the print mechanism PM and the display mechanism D in accordance with code data inputted from the character keys 10 and the function keys 11, 12, 100, 101, 102 of the keyboard 3, program data for classifying the titles by kinds and visually representing the same, and a control program used for title display control described below.

The RAM 50 comprises a carriage position memory (not shown), a line buffer memory 51, a text memory 52, a cursor display position counter 53, a cursor position pointer 54, a text title memory 55, a phrase memory 56, and a phrase title memory 57. The current carriage position memory is used for sequentially renewing and storing, in a typewriter mode, the current position of the carriage 22 (print head) relative to its absolute original position corresponding to the print position. The line buffer 51 is used for sequentially storing, in a typewriter mode, the data such as printed characters correspondingly to the print position. The same line buffer 51 may also be used for storing, in a memory mode, two-line data of characters and so forth inputted from the keyboard 3 or readout from the text memory 51 and visually represented on the display 75. The text memory 52 is used for storing the text input data corresponding to documents in a data file form. The cursor display position counter 53 is used for counting the cursor display position corresponding to each display position on the display 75 in accordance with the shift of the cursor. The cursor position pointer 54 is used for indicating the address of the line buffer 51 in accordance with the data of the cursor display position counter 53. The text title memory 55 is used for storing the titles of text data in the text memory 52. The phrase memory 56 is used for storing the phrase input data representative of phrases, short sentences and so forth. The phrase title memory 57 is used for storing the titles of the phrases in the phrase memory 56. The RAM 50 may also include: a typewriter mode flag memory 58 for storing a typewriter mode flag which is set with selection of a typewriter mode by depression of the mode changeover key 11; a word-processor mode flag memory 59 for storing a word-processor mode flag set with selection of a word processor mode by depression of the mode changeover key 11; a card connection flag memory 60 for storing a card connection flag set upon connection of a RAM card 80 serving as an external memory; and a plurality of other memories for temporarily storing the results of computations executed in the main CPU 30.

When power is initially supplied, a typewriter mode is automatically selected to set a typewriter mode flag for the system. Thereafter, a word processor mode and a typewriter mode are selected alternately by every depression of the mode changeover key 11.

In the typewriter mode, the main CPU 30 actuates the print mechanism PM in compliance with the control program to print the characters and symbols which correspond to the data inputted from the character keys 10, and stores the print data temporarily in the line buffer 51 corresponding to the print position.

In the word processor mode, the main CPU 30 stores the input data of two print lines in the line buffer 51 while visually representing such data on the display 75, and further stores the data of one line sequentially in the text memory 52 in response to depression of the return key 100.

The display mechanism D comprises an interface 70, a display CPU 71, a character generator 72, a display controller 73, and an LCD display 75 which are connected as illustrated. In the character generator 72, there are stored dot matrix display data for about 400 characters for visually representing the characters and symbols on the LCD display 75 in conformity with the code data. In response to the command data and the character data outputted from the main CPU 30 via the interface 70, the display CPU 71 reads out the corresponding display data from the character generator 72 and outputs the display data to the display controller 73.

The display controller 73 writes the display data in the display RAM 74 while outputting to the LCD display 75 the display signal corresponding to the display data. Furthermore, in response to the cursor shift data fed from the main CPU 30 via the interface 70, the display CPU 71 executes cursor shift control for instructing the display controller 73 to indicate the address to which the cursor is to be shifted.

The RAM card 80 includes a card text memory 81 for storing a plurality of file data in a manner similar to the text memory 52 of the RAM 50, and a card title memory 82 for storing the titles of such file data. When the RAM card 80 is selected, the write data from the main CPU 30 is written in the text memory 81 via the input-output 400 and so forth, and the read data from the text memory 81 is transferred to the main CPU 30.

Figure 3:
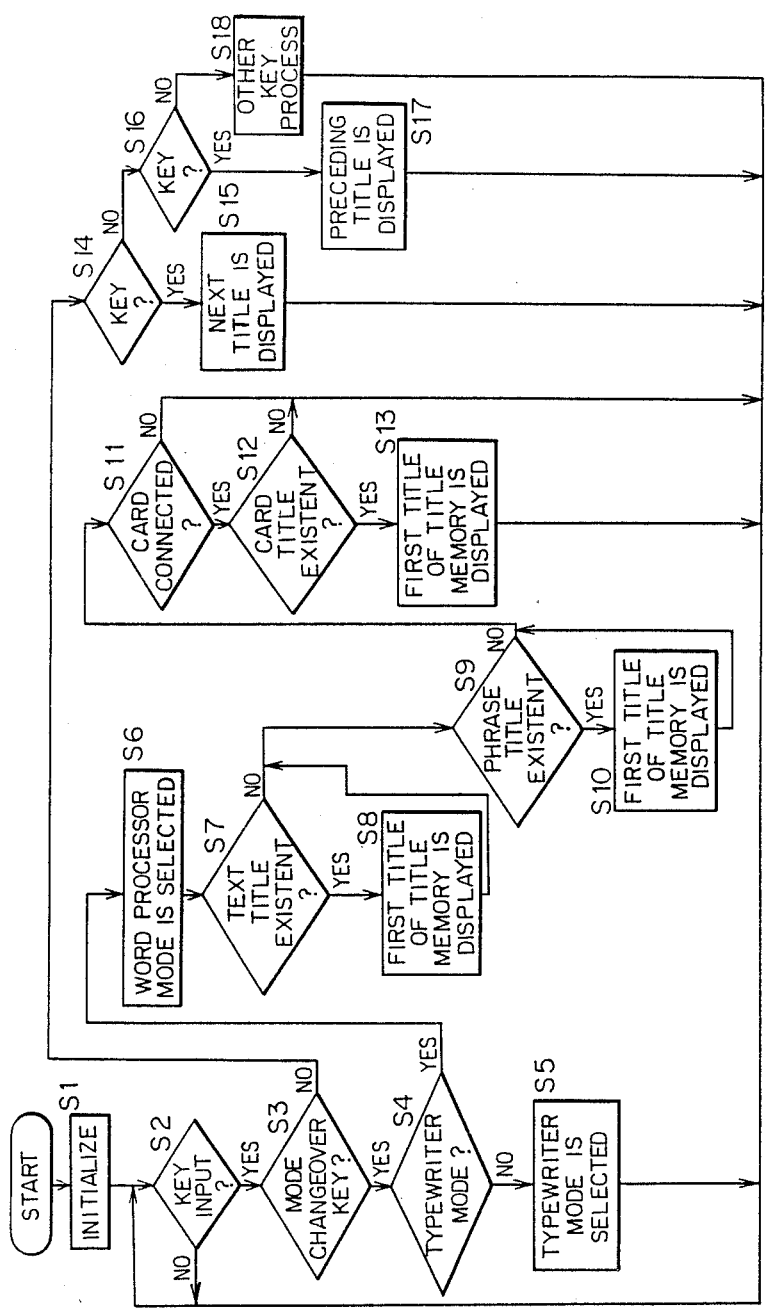
FIG. 3 is a flow chart of title display control routines.

Now, a description will be given for the title display control, which is executed by the controller C of the electronic typewriter 1, with reference to a flow chart illustrated in FIG. 3. When power is supplied to the typewriter 1, program control is started by advancing to step S1 (hereinafter step S1 and other steps will be referred to simply as S1) for initialization of selecting a typewriter mode and setting a typewriter mode flag.

Next in S2, the program waits for a key input. Upon depression of any key, a decision is made in S3 as to whether the key input is from the changeover key 11 or not. In the case of the mode changeover key 11, a decision is made in S4 as to whether to select the typewriter mode or not from the data of the typewriter mode flag memory 58 and the word processor mode flag memory 59. If the result of such decision is not the typewriter mode, the control program advances to S5 for selecting the typewriter mode and setting a typewriter mode flag. Then the program returns to S2 with a word processor mode flag reset.

Meanwhile, when the result of the decision in S4 is Yes, the program advances to S6 for selecting a word processor mode and resetting a typewriter mode flag while setting a word processor mode flag.

Figure 4A:
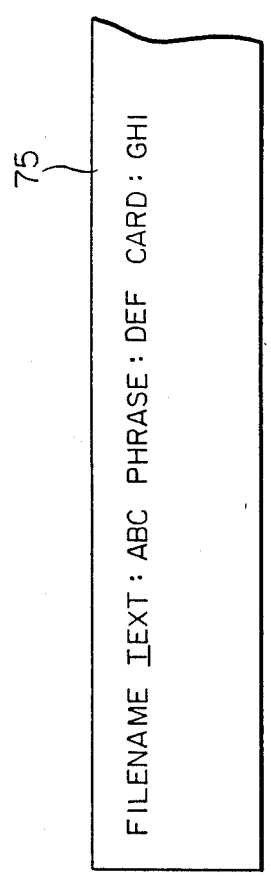
FIGS. 4(a) and 4(b) illustrate an example of visually representing titles of data memories on an LCD display with division by kinds of the data memories.

Next in S7, a decision is made as to whether the title of the text memory 52 is existent or not from the data of the text title memory 55. In case the title is existent, the program advances to S8 where the title stored first in the title memory 55 is visually represented next to an item marked "TEXT" on the display 75, and then the program advances to S9. For example, the first text title "ABC" is represented as illustrated in FIG. 4(a).

If the result in S7 is No, the program advances to S9 where a decision is made as to whether the title of data in the phrase memory 56 is existent or not from the data of the phrase title memory 57. In case the title is existent, the procedure advances to S10 where the phrase title stored first in the title memory 57 is visually represented adjacent to an item marked "PHRASE" on the display 75, and then the program further advances to S11. For example, the first phrase title "DEF" is represented as illustrated in FIG. 4(a).

In case the result is S9 is No, the program advances to S11 where a decision is made as to whether the RAM card 80 is connected or not according to the card connection flag of the card connection flag memory 60. If a connection of the RAM card 80 is detected, the procedure advances to S12 where a decision is made as to whether the text title of the card text memory 81 in the RAM card 80 is existent or not from the data of the card title memory 82. In case the title is existent, the program advances to S13 where the title stored first in the title memory 82 is visually represented next to "CARD" on the display 75, and then the procedure returns to S2. For example, the first card title "GHI" is represented as illustrated in FIG. 4(a).

Figure 4B:
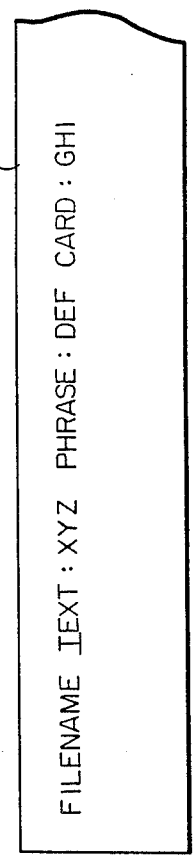

If the result of the decision in S11 or S12 is No, the program returns to S2. When the cursor down-shift key 12d is depressed for visual representation of a file name, the result in S14 becomes Yes through S2 and S3, so that in S15 the next titles are represented in accordance with the data of the cursor position pointer 54 and the data of the title memories 55, 57 and 82 corresponding to the item (i.e. either TEXT, PHRASE or CARD) at the cursor display position. Subsequently, the control program returns to S2. For example, in case the cursor is placed at the item "TEXT", the next text title "XYZ" of the text title memory 55 is represented as illustrated in FIG. 4(b).

When the cursor up-shift key 12c is depressed for visual representation of a file name (i.e. a memory title), the result in S16 becomes Yes through S2, S3 and S14, so that the program advances to S17 where the preceding title is visually represented in accordance with the data of the cursor pointed 54 and the data of the title memories 55, 57 and 82 corresponding to the item at the cursor display position. Subsequently the program returns to S2. For example, in case the cursor is placed at the item "TEXT", the preceding text title "ABC" of the text title memory 55 is represented as illustrated in FIG. 4(a).

Upon depression of any key other than the mode changeover key 11 and the cursor up-shift and down-shift keys 12c, d the control program advances through S2, S3, S14 and S16 to S18 for inputting or printing the character of one of the depressed character key 10 or executing the process relative to a depressed function key and subsequently returns to S2. In S18, the cursor is sequentially shifted in response to each depression of the cursor right-shift key 12a from position "T" of item "TEXT" to position "P" of item "PHRASE", then to position "C" of item "CARD" and so forth as illustrated in FIG. 4(a). In response to each depression of the cursor left-shift key 12b, the cursor is sequentially shifted from position "T" of "TEXT" to position "C" of "CARD" and then to position "P" of "PHRASE". An operator may designate or select the data associated with the title indicated after position of the cursor, by depressing return key 100.

When any character key 10 or function key 11, 12, 100, 101, 102 is depressed, the data related to the title of the data memory indicated by the cursor is visually represented, and thus the title display control is completed.

As described hereinabove, the titles of the individual data memories such as the text memory 52 and the phrase memory 56 are visually represented together in the display areas but are stored separately in accordance with the kinds of the data memories, so that any desired type of title can be retrieved with facility and rapidity.

Furthermore, due to simultaneous visual representation of the titles stored in title memory 82 of the RAM card 80, the location of the desired title is defined to consequently enhance the operational efficiency.

The embodiment mentioned is concerned merely with an exemplary case where titles are displayed when a word processor mode is selected. However, an exclusive display key such as 101 may be provided separately so that the titles can be visually represented at any time by depression of such display key 101. The above embodiment is constructed so that the titles of the data memories are visually represented upon selection of a word processor mode, and the title display control is completed by depression of a character key 10 or a function key 11, 12, 100, 101, 102. However, it may be modified in such a manner that a menu including items of "new composition", "edit" and so forth is first displayed in response to selection of a word processor mode, then the titles of the individual data memories are displayed when the "edit" is designated and, upon depression of a selector key such as 102 is provided separately.

What is claimed is:

1. A text processing system which comprises input means for inputting text data;

display means for visually representing at least the input text data;

a plurality of text data memory means for storing the input text data;

a plurality of title memory means, each title memory means corresponding to each of said text data memory means and being provided for storing at least one title name of the text data stored in a corresponding text data memory means;

control means for setting a separate display area on said display means for the respective text data memory means and for simultaneously representing at least two title names on each of said separate display area of said display means, said title names being classified on said display means to correspond with the respective text data memory means; and designating means for designating one of said title names of said text data memory means represented on said display means.

2. The text processing system according to claim 1 wherein said text data memory means comprises at least an internal text memory for storing the input text data as file data, and an internal phrase memory for storing the input text data as phrase data.

3. A text processing system which comprises:

input means for inputting text data;

display means for visually representing at least the input text data;

a plurality of text data memory means for storing the input text data;

a plurality of title memory means, each title memory means corresponding to each of said text data memory means and being provided for storing at least one title name of the text data stored in a corresponding text data memory means;

control means for setting a separate display area on said display means for the respective text data memory means and for visually representing the names of respective text data memory and one of respective title names stored in said respective text data memory means of display area; and designating means for designating one of said title names of said text data memory means represented on said display means.

4. The text processing system according to claim 3 wherein said designating means comprises selective means for selecting one of the data memory means represented on said display means, and change means for changing title names represented in the display area of the text data memory means selected by said selective means in accordance with the title names stored in said title memory means corresponding to said selected text data memory means.

* * * * *